Dec. 7, 1954   G. A. BELL   2,696,071
BEET TOPPING MACHINE
Filed July 7, 1951

Inventor
George A. Bell,
By
ATTORNEY 2,696,071

Patented Dec. 7, 1954

2,696,071

BEET TOPPING MACHINE

George A. Bell, Lethbridge, Alberta, Canada

Application July 7, 1951, Serial No. 235,603

3 Claims. (Cl. 56—121.42)

This invention relates to beet topping machines having as its object the provision of more suitable and efficient means for slicing off the tops of the beets at a uniform depth down from the upper surface thereof than is found in conventional practice, and the slicing includes the heavy foliage of the beet.

Heretofore beet trimming and topping machines have been developed for slicing off the tops of beets, but in such machines a considerable quantity of waste has resulted due to the fact that the beets are naturally exposed at varying heights above the ground level.

The advantage of my machine is that slicing blades for removing the tops are automatically raised and lowered so as to trim off every beet with a minimum of waste beet, this being accomplished by providing cross barred feeler wheels which creep up and over the top of the beets to gather the foliage in readiness for severance with the following blades together with a very small portion of the beets, the blades rising and falling in exact relationship with the feeler wheels, each of which wheels trims a single row of beets.

A further advantage is that the depth of slicing from the top of a beet may be regulated closely to provide uniform topping depth for varying kinds of beets, and for topping in the most economical manner as far as the waste portion of the beet is concerned.

At least two feeler wheels would be installed as a unit machine, and they would be spaced to adequately cover two rows of beets at a time, and the wheels and their carrying frame would float, being radially mounted on the rear end of a tractor, and bearably so on a shaft driven off a pulley attached to the hub of one rear wheel of the tractor, the feeler wheels being chain and sprocket driven off this shaft.

Each beet cutting blade is mounted on an auxiliary frame adjustably pivoted to the wheel frame of the machine for gauging the proper and most suitable height of a blade relative with the height of the feeler wheel with which it is associated, and the ground over which it is passing as well as over the beets. The frame of these wheels depends from a beam which is carried on the conventional hydraulically controlled member of a tractor, and may therefor be hydraulically raised and lowered as required.

With the above mentioned objects and advantages in view this invention consists in the novel features of construction hereinafter described and claimed, and in the drawings accompanying this specification it must be observed that similar numerals refer to similar parts throughout the different views.

Figure 1:
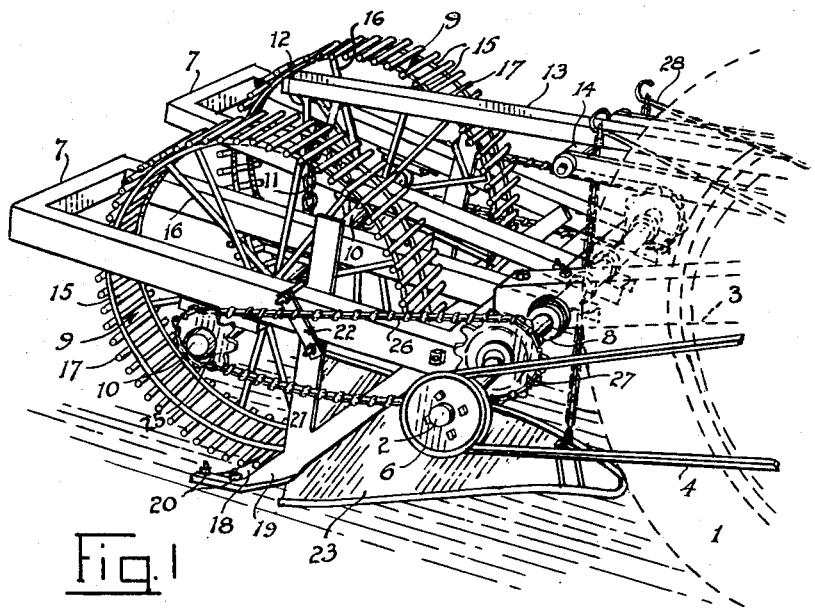
Fig. 1 is a view in perspective of the machine for trailing behind a tractor.
Figure 2:
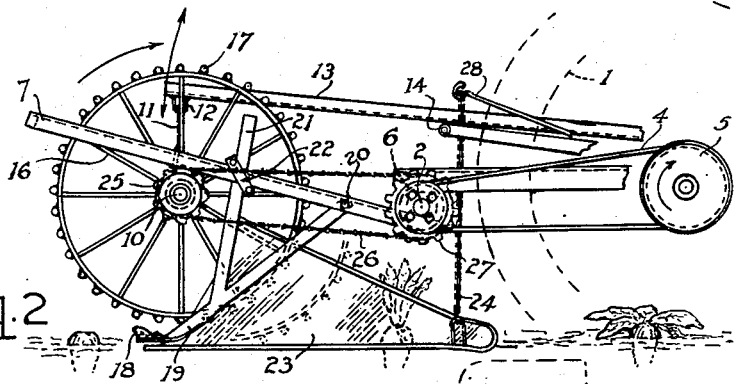
Fig. 2 is a side elevational view drawn on a reduced scale.
Figure 3:
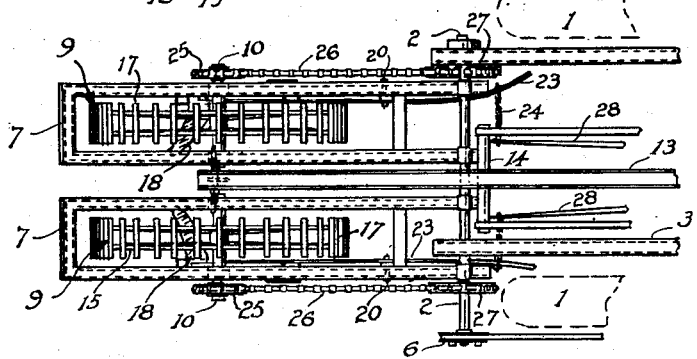
Fig. 3 is a plan view of Fig. 2.

Referring to the drawings, the rear wheels of a tractor are indicated by the numeral 1, and a shaft or countershaft 2 is bearably mounted on supporting structure such as beams 3 projecting from the rear of the tractor, the shaft and its bearings (not shown) depending therefrom. The shaft 2 is driven by a V-belt 4 and a pulley 5 on the rear wheel axle of the tractor and a pulley 6 on the outboard end of the shaft.

Identical rectangular frames 7 are dependent at their ends adjacent to the tractor and attached to the shaft 2 by bearings 8. Each of these frames encloses a feeler wheel 9 mounted by means of a transverse short axle 10, each axle being journaled on the underside of its frame.

These frames are slung by means of a chain 11 passing through the eye 12 on the underside of the free end of a hydraulically operated lift bar 13 anchored to the tractor. This bar is fulcrumed on the conventional hydraulically operated member 14 of the tractor. Thus the wheels may be raised clear of the ground when the machine is not operated. Otherwise the wheels travel on the ground and independently roll over the tops of the beets as each wheel travels along a single row of beets. Each of these wheels consists of a pair of peripheral hoops 15 with spokes 16, and the hoops are connected together by transverse short pieces of round bars 17. These cross bars help to gather the foliage of the beet and position it ready for the slicing operation. This slicing is accomplished by a blade 18 mounted on the bottom end of a lever 19, the lever being pivoted on the outer beam member of each frame by bolt 20. This blade projects inwardly under its associated wheel, and approximately for the full width thereof, and at an adjustable distance therebelow. The adjustment of the blade is regulated by an arm 21 which bifurcates upwardly from the lower end of the lever 19 to pass these outer frame members in each case. The long arm of each lever is used as a handle to raise or lower the blade, and is secured to its adjacent side member of the frame by a bolt bent around the member, and a plate and nuts as at 22.

Side wings 23 are attached to and project forwardly from these blade adjustment members to assist in gathering together the top foliage of the beets, which foliage is generally much spread over the ground. The ends of these wings are supported by chains 24 depending from the conventional hydraulically regulated lift arms of the tractor.

Each axle 10 of each wheel is rotated by means of an outboardly disposed sprocket 25 mounted thereon, which sprocket is chain-driven as at 26 from the countershaft 2 by means of a sprocket 27 on each end of the shaft. The shaft 2 is driven by a pulley on its one outboard end with belt and pulley from the tractor rear wheel as previously described.

Each chain 24 is suspended from one of the hydraulically controlled elements of the tractor for adjustment of the height of its associated wing 23 on a side of the machine, this element being designated by the numeral 28.

The important feature of this machine is that the height of the slicing operation is not measured from the ground up, but it is the depth as measured downwardly from the bottom of the foliage. This method therefore assures a minimum of beet wastage.

What I claim and desire to secure by Letters Patent:

1. A mobile beet topping machine adapted to be secured behind a tractor or the like and to be operated from a source of power thereon, said machine comprising in combination supporting structure extending rearwardly from said tractor, a transverse countershaft spanning said supporting structure and being journalled for rotation thereon, at least one wheel carrying frame swingably mounted adjacent the front end thereof, on said countershaft, and extending rearwardly therefrom, a feeler wheel journalled for rotation within said frame and selectively adapted to engage the ground, said feeler wheel including a pair of spaced and parallel peripheral hoops and a plurality of transversely disposed, spaced and parallel bars spanning said hoops and adapted to erect the beet foliage prior to the beet topping operation, means to rotate said wheel by said source of power, and an adjustable beet topping blade depending from said wheel carrying frame and adapted to be positioned adjacent to and below said feeler wheel and at least not in advance of the vertical centre line thereof, said wheel adapted to roll over the tops of said beets thereby positioning said blade substantially the same distance from the upper surface of the associated beets immediately prior to said topping operation.

2. The device according to claim 1 which includes a lever pivotally mounted by one end thereof to said wheel carrying frame and extending downwardly and rearwardly therefrom, said blade being secured to the lower end of said lever an actuating arm extending upwardly from a point along the length of said lever, said arm being detachably clamped to said wheel carrying frame whereby the vertical relationship between said wheel and said blade can be adjusted.

3. The device according to claim 2 which includes a wing guide secured to said lever and extending rearwardly therefrom, said guide adapted to gather in the beet foliage prior to erection of same by said feeler wheel.

References Cited in the file of this patent

UNITED STATES PATENTS

| Number | Name | Date |
|---|---|---|
| 896,557 | Lesh et al. | Aug. 18, 1908 |
| 1,050,633 | Ferman et al. | Jan. 14, 1913 |
| 2,174,310 | Tuft et al. | Sept. 26, 1939 |
| 2,336,623 | Loucks et al. | Dec. 14, 1943 |
| 2,438,627 | Walz et al. | Mar. 30, 1948 |
| 2,535,960 | Schmidt | Dec. 26, 1950 |